May 12, 1964     R. W. NICKERSON     3,132,397
SAFETY PIN
Filed March 5, 1962
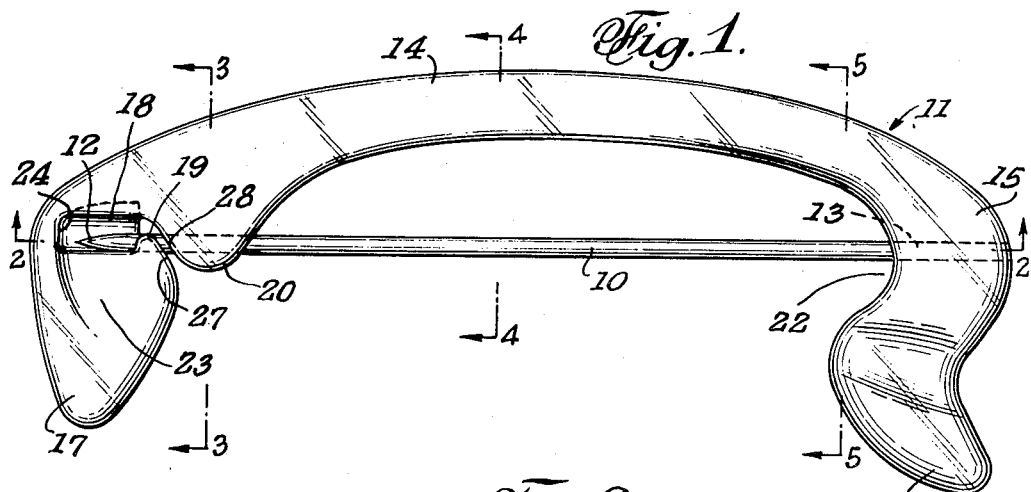
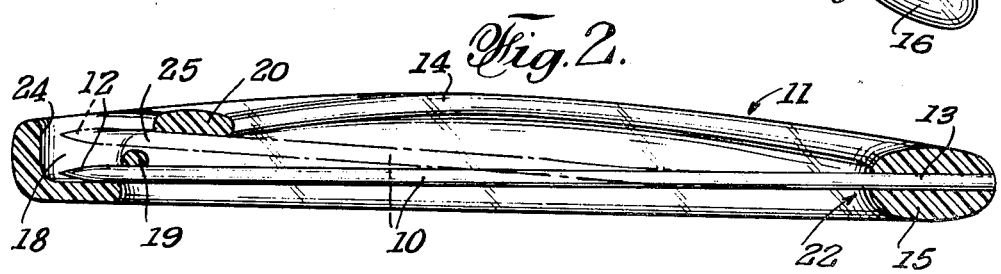
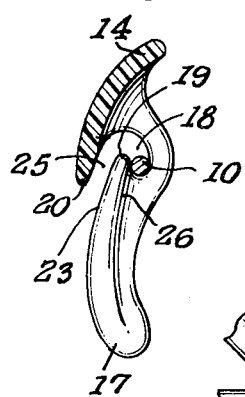
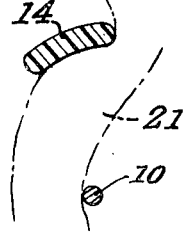
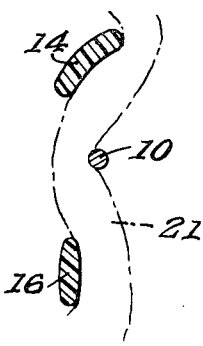
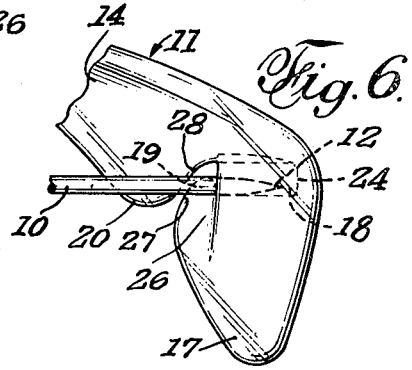
INVENTOR.
RICHARD W. NICKERSON
BY C. F. Stratton
ATTORNEY 3,132,397
SAFETY PIN
Richard W. Nickerson, 5261 Sierra Villa Drive,
Los Angeles 41, Calif.
Filed Mar. 5, 1962, Ser. No. 177,379
6 Claims. (Cl. 24—161)

This invention relates to a safety pin.

An object of the present invention is to provide a self-closing safety pin.

Another object of the invention is to provide a self-closing safety pin that is safely locked against accidental opening by rotation around the axis of the pin after application.

Further objects of the invention are to safely hold the point of the pin protected to prevent injury both when in use and when not in use, to provide for easy retraction removal of the pin after the same has been re-rotated to initial application position, to safely hold the pin frame non-rotational to insure against accidental retraction of the pin from operative position, and providing in the pin frame for housing pinned material thereby enabling a generally flat relationship between the pin and the material pinned thereby.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a plan view of a safety pin according to the present invention and showing the side thereof that is on the outside when the pin is applied.

FIG. 2 is a longitudinal sectional view as taken on the line 2—2 of FIG. 1.

FIGS. 3, 4 and 5 are cross-sectional views as taken on the respective lines 3—3, 4—4 and 5—5 of FIG. 1.

FIG. 6 is a broken plan view of the opposite face of the left end of the safety pin as in FIG. 1.

The safety pin that is illustrated comprises, generally, a pin member 10, and a generally C-shaped frame 11 in which said pin member is fixedly mounted.

The pin member 10 preferably comprises a straight piercing member having a point 12 at one end, the opposite end 13 being blunt. Said member 10, typically, is springy and flexible in substantially the same degree as the pins of ordinary safety pins. In the present case, said pin member seeks a straight condition when released from a flexed condition.

The frame 11 is preferably molded of a synthetic plastic. Any of the tough and high impact resins, such as acrylics, phenolics and many others, may be used. In the present case, the frame 11 is integrally molded or otherwise formed to comprise, generally, a shank 14, an end 15 in which the blunt end 13 of the pin member 10 is firmly and permanently anchored, an anti-rotation extension 16 on said end 15, an anti-rotation extension 17 on the opposite end of the shank 14, a recess 18 at said end to house the point 12 of the pin member 10, a projection 19 on the extension 17 in opposition to said recess 18, the pin point 12 residing between said recess and projection, and a guide shield 20 extending from the frame shank 14 in overstanding relation to the pin member 10 immediately inward of the point 12 thereof.

The shank 14 is preferably concavely arched, as in FIG. 1, and, as shown in FIGS. 4 and 5, the same is preferably concave in transverse section to accommodate material 21 connected by the present pin, thereby enabling the same to lie flat against the material and minimizing snagging or catching of the pin on other materials or objects.

The end 15 is sharply concavely curved to form an inwardly facing bight 22 to hold pinned material firmly and smoothly against the frame at the shank 14 and under the extension 16.

The extension 16, together with the end 15, comprises the portion of the frame that is grasped for inserting the pin point 12 into material to be pinned and for turning the frame to pin-locking position. Since said extension 16 is offset from the axis of pin 10 oppositely from the shank 14, the former has the mentioned anti-rotation function.

The extension 17, in addition to having the same anti-rotation purpose as extension 16, is provided, on one face, with a slide surface 23 that slopes downwardly toward the well 18, the same, therefore, serving to guide the pin point 12 from a flexed condition thereof to a straight condition residing in the recess.

Said recess 18 comprises a concavity in the outer surface of the frame 11 and is formed to loosely accommodate the pin point 12. An end wall 24 in the recess protects said point which, therefore, cannot cause injury when the same is in the recess.

The projection 19 overstands the pin point 12, the outer face thereof being an extension of the surface 23 and guiding the pin point into the recess 18. Said projection prevents a forward deflection of the pin point and dislodgement from the recess.

The guide shield 20 depends from the frame shank 14 laterally inward from the recess 18 and overstands the pin 10 adjacent to the portion thereof in the recess. A passage 25 is defined between said shield and the extension 17 to pass the pin point 12 in its movement from and to the well 18. As shown in FIG. 6, the extension 17, on the under side thereof, is beveled at 26 so that material being pinned may crowd in between the pin point 12 and said bevel, thereby pushing the pin transversely into the pocket 18 and creating a safe locking effect.

Said guide shield 20 cooperates with the material being pinned to facilitate extraction of the pin from material-pinning engagement. A lateral bulge 27 formed on the extension 17 cooperates with the edge 28 of said guide shield 20 to cause the pinned material to push the pin 10 clear of the shield and out of its recess 18, thereby allowing ready endwise retraction of the safety pin.

To apply the present safety pin, the point 12 is flexed over the projection 19 and away from the guide shield 20, exposing said point. An endwise push causes said point to thread through the material being pinned. Now, the pin point is released and the same finds its way into the recess 18. The frame is turned 180° on the axis of the pin 10, firmly locking the safety pin. This is the position of use. The same is removed by re-rotating the frame to its original position and applying an endwise pull on the frame to extract the pin 10 from engagement with the material. Immediately, the pin 10 will resume its normal straight position and the point 12 will fall into the recess 18.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A safety flexible pin comprising
   (a) a pin member having a point at one end, and
   (b) a rigid C-shaped frame of plastic material having a shank disposed on one side of the pin member and in one end of which the other end of the pin member in anchored to extend between the ends of the frame, said frame being rotational around the axis of the pin,
   (c) anti-rotation extensions on the frame ends to engage material connected by the pin member and extending on the side of the pin axis opposite to the frame shank to retain the frame in flatwise engagement with said material both in pinning position and in pin-extracting position,
   (d) said frame, at the end thereof opposite to the pin-anchoring end, having a recess to receive the pin point,
   (e) a pin point-retaining projection on the anti-rotation extension at the end of the frame that has the recess and located between the pin point and the anchored end of the pin,
   (f) said pin, being in straight unflexed condition when the point thereof resides in said recess,
   (g) a sloping face on the last-mentioned extension to guide the pin point, from a flexed condition of the pin, into the recess, and
   (h) a guide shield extension on said frame shank adjacent to and inwardly spaced from the mentioned projection to define a passage to pass the pin point in its movement toward and away from the recess, said guide shield having a face to direct the pin point into and out of the recess.

2. A safety pin according to claim 1 in which is provided a pin-passing passage between the projection and the guide shield.

3. A safety pin according to claim 1 in which the pin-passing passage is defined between opposed and spaced guide edges of the projection and the guide shield and which push the pin point clear of the guide shield and out of the recess when material pinned by the safety pin is crowded in between the pin point and the sloping face of the first-mentioned extension.

4. A safety pin comprising
   (a) an elongated plastic frame having an arched shank with a transversely curved cross-sectional form,
   (b) one end of the frame being provided with an extension that is directed substantially normal to the length of the shank,
   (c) a flexible pin having one end fixedly anchored in said end of the frame with the frame shank on one side of the pin axis and the extension on the opposite side, said pin extending toward the other end of the frame with a point on said end of the pin,
   (d) a second extension on the latter end of the frame on the same side of the pin as the first mentioned extension,
   (e) the shank and the two extensions being integral and constituting anti-rotation means that engages the material connected by the pin between said extensions,
   (f) the second extension, where the same is joined to the frame shank, having a recess for receiving the pin point,
   (g) a projection on the second extension directed toward the recess to retain the pin point in said recess, the recess having a pin-receiving portion into which the pin point is adapted to be moved to be beyond the end of said projection so as to clear said pin for flexure and movement between the recess and the outer side of the projection, and
   (h) a sloping face on the second extension to direct the pin point to and from the mentioned projection and into and out of the recess.

5. A safety pin according to claim 4 provided with a guide shield extension on the frame shank directed oppositely to the projection and spaced laterally therefrom, said guide shield extension and said projection defining a passage in which the pin point moves during movement into and out of the recess.

6. A safety pin according to claim 4 provided with a guide shield extension on the frame shank directed oppositely to the projection and spaced laterally therefrom, said guide shield extension and said projection defining a passage in which the pin point moves during movement into and out of the recess, said guide shield extension being provided with a curved face directed toward the projection on the second extension and which biases the pin point in a direction toward the recess and behind the projection and to guide the pin point out of the recess.

References Cited in the file of this patent

UNITED STATES PATENTS

| 481,834 | Snell | Aug. 30, 1892 |
| 1,086,997 | Collins | Feb. 10, 1914 |
| 1,182,703 | Noxon | May 9, 1916 |
| 1,556,509 | Hochreiner | Oct. 6, 1925 |
| 2,375,239 | Munyer | May 8, 1945 |
| 2,551,063 | Sneirson | May 1, 1951 |
| 2,554,519 | Burbig | May 29, 1951 |

FOREIGN PATENTS

| 47,951 | Austria | May 26, 1911 |
| 320,704 | Germany | May 5, 1920 |
| 1,099,772 | Germany | Feb. 16, 1961 |